(12) United States Patent
Hall

(10) Patent No.: US 9,667,062 B2
(45) Date of Patent: May 30, 2017

(54) FAULT CURRENT LIMITER

(75) Inventor: Jeremy Peter Hall, South Glamorgan (GB)

(73) Assignee: Faultcurrent Limited, Cardiff (GB)

( * ) Notice: Subject to any disclaimer, the term of this patent is extended or adjusted under 35 U.S.C. 154(b) by 239 days.

(21) Appl. No.: 14/241,197

(22) PCT Filed: Aug. 30, 2012

(86) PCT No.: PCT/GB2012/052120
§ 371 (c)(1),
(2), (4) Date: Feb. 26, 2014

(87) PCT Pub. No.: WO2013/030571
PCT Pub. Date: Mar. 7, 2013

(65) Prior Publication Data
US 2014/0192450 A1 Jul. 10, 2014

(30) Foreign Application Priority Data

Aug. 31, 2011 (GB) .................................. 1115005.9

(51) Int. Cl.
*H02H 3/08* (2006.01)
*H02H 9/02* (2006.01)
(Continued)

(52) U.S. Cl.
CPC ............... *H02H 9/021* (2013.01); *H01F 3/10* (2013.01); *H01F 29/146* (2013.01); *H01F 38/023* (2013.01); *H01F 2003/103* (2013.01)

(58) Field of Classification Search
CPC .......... H02H 9/021; H03F 3/10; H01F 38/023
(Continued)

(56) References Cited

U.S. PATENT DOCUMENTS 5,317,228 A * 5/1994 Leupold .................. H02K 31/02
310/154.21
5,466,474 A * 11/1995 Gaylor .................... B65B 29/02
426/394
(Continued)

FOREIGN PATENT DOCUMENTS

EP 2068330 6/2009
JP 55 120117 9/1980
(Continued)

OTHER PUBLICATIONS

"An Extended Magnet in a Passive dI/dt Limiter", Young S.J. et al., Journal of Applied Physics, American Institute of Physics, vol. 76, No. 10, Part 02, Nov. 15, 1994.
(Continued)

*Primary Examiner* — Thienvu Tran
*Assistant Examiner* — Lucy Thomas
(74) *Attorney, Agent, or Firm* — Gordon & Jacobson, P.C.

(57) ABSTRACT

A fault current limiter (FCL) includes at least one magnetisable core member and at least one AC magnetomotive force source configured to generate a varying magnetic flux in at least a portion of the at least one magnetisable core member. At least one static magnetomotive force source is positioned to provide a magnetic circuit within at least part of the at least one magnetisable core member and the AC magnetomotive force source and the static magnetomotive force source are relatively positioned to be orthogonal to each other. Typically the static magnetomotive force source may be a permanent magnet and the AC magnetomotive force source configured to generate a varying magnetic flux in both of first and second spaced core members.

26 Claims, 17 Drawing Sheets

(51) Int. Cl.
  *H01F 3/10* (2006.01)
  *H01F 29/14* (2006.01)
  *H01F 38/02* (2006.01)
(58) Field of Classification Search
  USPC .......................................................... 361/93.6
  See application file for complete search history.

(56) References Cited

U.S. PATENT DOCUMENTS

| | | | | |
|---|---|---|---|---|
| 5,466,574 | A | * | 11/1995 | Liberti ...................... A23L 3/32 209/214 |
| 5,926,083 | A | * | 7/1999 | Asaoka ..................... H01F 3/10 336/110 |
| 6,445,130 | B1 | * | 9/2002 | Leupold ................ H01F 7/0278 315/4 |
| 6,885,272 | B1 | | 4/2005 | Piaskowski et al. |
| 2005/0068144 | A1 | * | 3/2005 | Miettinen ............... H01F 37/00 336/182 |
| 2006/0038456 | A1 | * | 2/2006 | Bojiuc ................... H02K 23/04 310/156.32 |
| 2010/0296217 | A1 | * | 11/2010 | Darmann ................. H01F 6/06 361/93.5 |

FOREIGN PATENT DOCUMENTS

| | | |
|---|---|---|
| JP | 2005 204457 | 7/2005 |
| WO | WO2007/029224 | 3/2007 |
| WO | WO2011/024179 | 3/2011 |

OTHER PUBLICATIONS

"Development of Passive Fault Current Limiter in Parallel Biasing Mode", Iwahara M. et al., IEEE Transactions on Magnetics, IEEE Service Center, vol. 35, No. 5, Part 02, Sep. 1, 1999.

* cited by examiner

FAULT CURRENT LIMITER

CROSS-REFERENCE TO RELATED APPLICATIONS

This application claims priority from PCT Application No. PCT/GB2012/052120, filed Aug. 30, 2012 and from GB 1115005.9 filed on Aug. 31, 2011, both of which are hereby incorporated by reference herein in their entirities.

BACKGROUND OF THE INVENTION

1. Field of the Invention

Field of present invention relates to a fault current limiter and in particular a fault current limiter having a re-settable static magnetomotive force source.

2. State of the Art

A Fault Current Limiter (FCL) is a device used to limit, or in its most basic form interrupt, a fault current in a branch of a circuit on occurrence of a fault condition so as to prevent any components in the circuit from being overloaded.

Fuses are an example of a device which interrupts high currents in fault conditions, however these devices must be replaced after a fault condition has occurred and cannot be used in high power systems. It is usually more preferable to employ a re-settable FCL which limits the fault current, rather than interrupts it.

An example of a re-settable FCL which is suitable for low power operations is the Magnetic Current Limiter (MCL) which comprises a permanent magnet sandwiched between a saturable core with an AC wire wound around the core (see FIG. 1). The permanent magnet 2 causes the core to saturate in the normal operating state. For the device to operate for each half of the AC cycle, two cores are required such that in the first core the magnetic field produced by the AC current flows through the coil since the magnetic field provided by the permanent magnet are additive and in the second core they are subtractive. In the normal operating condition the AC current flowing through the coil is low and both cores are saturated causing the effective impedance in the AC coil 3 to be low. During a fault condition a large AC current value (the fault current) forces each of the cores of the device to come out of saturation in alternative half-cycles. The mostly unsaturated first core in combination with the mostly saturated second core (and vice versa) restricts the flow of the fault current since the inductance of the coil is caused to increase. In this arrangement multiple distinct core elements are used and useful regions of the core, where interaction between the magnetic field associated with the magnet and the AC coil takes place, are limited. Further, the MCL does not perform well in high power alternating systems.

In higher power alternating power systems, series reactors have been implemented so as to protect against excessively large currents under short-circuit, however they have a major disadvantage in that they produce significant $I^2R$ losses.

Another system suitable for use in a high power alternating system is the saturated Iron Core FCL which comprises a copper coil with an iron core. The Iron core is maintained in magnetic saturation in normal operation by applying the magnetic field of an additional superconducting wire. The impedance of the device is low in normal operation; however when a fault condition occurs the increased AC current through the normal conducting coil causes the core to depart from saturation so as to cause the impedance of the device to increase. In this arrangement the superconducting wire is exposed only to DC current and therefore always remains in the superconducting state and eliminates the need for a recovery time. The main disadvantages with this system includes the large mass and volume of the device, the high magnetic fields at the superconducting coil and the high cooling costs of the superconducting coil.

A recently developed system for use in high power applications is the Superconducting FCL which relies on a rapid change of resistance with temperature so as to limit the fault current. The superconducting FCL is directly connected in series with the current path to be protected. When a specified current density is reached, which corresponds to a particular temperature, the resistance increases rapidly so as to substantially limit the flow of the fault current. Such arrangements have an array of disadvantages including: a) expensive cooling mechanisms since the superconductor must be cooled to 77K, b) the development of thermal instabilities and c) AC current cooling losses. Further, in order to prevent the excessive heating of the superconductor, so as to avoid long cool down phases, the reduced fault current is only be carried for a few cycles.

WO200702924 discloses a fault current limiter device in which an electromagnet DC source is utilised.

Due to the costs associated with the Saturated Iron Core FCL and the Superconducting FCL such systems are not usually desirable for smaller power operations e.g. circuits implementing power electronics devices such as transistors, diodes etc.

SUMMARY OF THE INVENTION

It is therefore desirable to provide an improved Fault Current Limiter which addresses at least some of the above described problems and/or which offers improvements generally.

In a first aspect of the present invention there is provided a fault current limiter (FCL) comprising:

at least one magnetisable core member;

at least one AC magnetomotive force source configured to generate a varying magnetic flux in at least a portion of the at least one magnetisable core member; and;

at least one static magnetomotive force source being positioned to provide a magnetic circuit within at least part of the at least one magnetisable core member, characterised in that the AC magnetomotive force source and the static magnetomotive force source are relatively positioned to be orthogonal to each other.

In one realisation of the invention, a first core member is provided, and a second core member is provided, spaced from the first core member, the AC magnetomotive force source configured to generate a varying magnetic flux in both of the first and second core members.

It is preferred that in such a realisation, the first core member comprises a first closed magnetic circuit and the second core member comprises a second closed magnetic circuit distinct from the first closed magnetic circuit.

This has an effect that during a fault current event, flux linkage is completed predominantly through the AC coils, through the cores, and magnetomotive force source (e.g permanent magnet(s)), not through the air outside the AC solenoid which is the case in some prior art systems. Effectively, this provides a closed magnetic structure for the AC circuit. The AC component of the field is encouraged to flow around the closed circuit.

The first and/or second magnetic circuit may be comprised of core members (for example segmented core members) spaced by air gaps. This has the benefit that the magnetic flux is inhibited from short circuiting in the soft magnetic cores. An air gap may also be inserted in the circumferential path of the soft magnetic cores so as to increase the reluctance to the AC flux of the soft magnetic core with minimal effect on the DC path reluctance. This extends the upper range of the FCL before very large AC fields from driving the core back to saturation.

It is preferred that the static magnetomotive force source is positioned to provide magnetic saturation in both of the magnetic circuits.

It is preferred that the static magnetomotive force source is positioned to bridge the gap between the first and second core members.

Beneficially, the static magnetomotive force source is positioned to provide a bifurcated magnetic field in the core adjacent to the static magnetomotive force source in which the field direction in the same core member branches in opposed directions at the junction with the static magnetomotive force source. This bifurcation of the static magnetic field at the junction with the core members, particularly where permanent magnets are used to bridge the gap between core members, provides protection against de-magnetisation of the static magnetomotive force source, during a fault current event. The arrangement provides common mode rejection of the AC field across the poles of the static magnetomotive force source.

Preferably the AC magnetomotive force source is an AC coil having a longitudinal axis and to which is applied an AC current so as to produce an AC magnetic field and the static magnetomotive force source is a magnet having a magnetic dipole moment associated with it.

Preferably the AC coil and the at least one magnet are relatively positioned such that the longitudinal axis of the coil is orthogonal to the magnetic dipole moment of the magnet. This beneficially protects the permanent magnets and aids saturation of the core material since the DC/static magnetomotive force can be more easily distributed without increasing the AC reluctance of the core material (since the relative permeability of the permanent magnetic material is low and is seen by the AC magnetomotive force as a high reluctance element in the magnetic circuit).

Preferably the arrangement of the at least one magnet causes at least part of the at least one core member to become saturated in normal operation wherein in a fault condition the magnitude of the AC magnetic field increases from a normal state value to overcome saturation in at least part of the at least one core member so that the AC coil obtains a higher inductance when a fault condition occurs so as to prevent the passage of the fault current through the coil.

Beneficially the at least one magnet is formed from a permanent magnetic material so as to provide a static magnetic (DC) field. The use of permanent magnets can be extremely beneficial in that there is no requirement to use superconducting systems or electromagnets that require significant power supply. The concern with the use of permanent magnets is their potential de-magnetisation during a fault current event and the result that the FCL would thereafter not re-set to a usable state. This concern is ameliorated by the way in which the permanent magnets are incorporated into the magnetic circuit of the device.

During a fault event the flux due to the mmf of the AC coil adds to and subtracts from the alternate sections or segments of the core members. Flux linkage is largely completed through the permanent magnets in the direction of pre-magnetised moment of the magnets. This flux linkage through the permanent magnet provides protection against demagnetisation. The permanent magnets being in closed magnetic circuit provides protection against demagnetisation. The limit of the fault current limiter will be when the flux due to the mmf of the AC coil drives all segments of the cores beyond saturation.

It is preferred that the static magnetomotive force source is positioned to bridge the gap between the first and second core members.

A benefit of the having magnets bridging the gap is that DC mmf can be distributed around the magnetic circuit without introducing a break the circuit of the cores. Further, since the magnetomotive force from the permanent magnet is more limited than for example a superconducting source, the magnetomotive force source may be augmented by distributing a number of pairs of magnets, again with no break in the magnetic circuit.

It is preferred that at least two static magnetomotive force sources are provided, preferably comprising permanent magnets and positioned to bridge the gap between first and second core members. It is preferred that one or more pairs of magnetomotive force sources are provided, preferably comprising permanent magnets and positioned to bridge the gap between first and second core members.

The benefit of such an arrangement is that a low reluctance DC flux path is provided to aid saturation and protection of the magnets, whilst at the same time allowing high levels of flux linkage through the magnetic circuit to give good current limiting inductance during a fault. The ability to include magnets distributed in this way provides distributed DC mmf around the magnetic circuit, aiding core saturation.

Beneficially the at least one magnetisable core member responds equally to the positive and negative halves of the AC current cycle received by the AC coil such that separate and distinct core devices for dealing with each half of the AC cycle (as in FIG. 1) are not required.

Preferably the permanent magnetic material of the at least one permanent magnet recovers its original magnetised state on cessation of a fault current event so as to automatically reset in preparation for the detection of the next fault current event.

Preferably the magnetisable core contains at least one air gap so as to space apart the permanent magnets so as to prevent the magnetic flux from short circuiting between the magnets which has the effect of reducing the flux in the soft magnetic cores. An air gap may also be inserted in the circumferential path of the soft magnetic cores so as to increase the reluctance to the AC flux of the soft magnetic core with minimal effect on the DC path reluctance. This avoids very large AC fields from driving the core back to saturation. In this arrangement it is preferable for the at least one air gap in the magnetisable core to be positioned above and below the surface of the pole faces of the at least one permanent magnet at the region of bifurcation so as to enhance the performance of the device by extending the working fault current limiting range. In an alternative embodiment the at least one magnet is intersected by an air gap so as not to increase the reluctance of the DC flux path, thereby aiding saturation of the soft magnetic cores in the regions between the magnets and also permitting the cores to be constructed in sections so as to aid the manufacturing process.

Beneficially the AC coil is wound around the region of the magnetisable core where the overcoming of saturation is to be achieved which reduces the flux leakage from the soft cores. The length of coil is also minimised in this arrangement.

Beneficially the AC coil is wound around the region of the magnetisable core where the overcoming of saturation is to be achieved which reduces the effect of the AC flux on the cores at normal low currents. The length of coil is also minimised in this arrangement. Either position or length of AC coils may be adopted in the case of optimising the low and high current ranges performance of the device.

Preferably the core member is formed from at least two core segments which are arranged to form the core as a whole.

Preferably the FCL can be used for single phase applications or for three-phase applications.

Beneficially there can be included shielding to minimise the effects of eddy currents or demagnetisation of the permanent magnet. This, therefore, has the beneficial effect of minimising eddy current heating and improves the performance of the FCL at higher temperatures, whilst ensuring the FCL is reset so as to permit detection of a further fault current event (and prevention of the fault current passing the coil).

Preferably the at least one magnetisable core member is formed of strip steel or other ferromagnetic metal alloy, a soft ferrite material or an amorphous or nanocrystalline soft magnetic alloy. These materials provide the desired saturation capability and can be driven from saturation in the event of a fault condition.

Beneficially a circuit or an alternating power system can include the fault current limiter of the invention.

In a second aspect of the present invention there is provided a fault current limiter comprising:
  at least one magnetisable core member having a void defined therein;
  at least one conductive element wound around at least a portion of the at least one magnetisable core member and configured to receive an AC current to generate an alternating magnetic field in at least a portion of the at least one magnetisable core member; and
  at least two magnets being arranged such that the magnetic dipole moments of the at least two magnets are opposing, the at least two magnets being positioned in contact with the at least one magnetisable core member to provide a magnetic circuit within the at least one magnetisable core member,
  characterised in that the conductive element and the at least two magnets are relatively positioned such that the direction of the AC magnetic field is substantially orthogonal to the magnetic dipole moment of the at least two magnets.

Preferably at least two magnets are formed from a permanent magnetic material further wherein the at least two magnets are separated by an air gap so as to prevent the magnetic flux from short circuiting between the magnets which has the effect of reducing the flux in the soft magnetic cores. An air gap may also be inserted in the circumferential path of the soft magnetic cores so as to increase the reluctance to the AC flux of the soft magnetic core with minimal effect on the DC path reluctance. This avoids very large AC fields from driving the core back to saturation. In this arrangement it is preferable for the at least one air gap in the magnetisable core to be positioned above and below the surface of the pole faces of the at least one permanent magnet at the region of bifurcation so as to enhance the performance of the device by extending the working fault current limiting range. In an alternative embodiment the at least one magnet is intersected by an air gap so as not to increase the reluctance of the DC flux path, thereby aiding saturation of the soft magnetic cores in the regions between the magnets and also permitting the cores to be constructed in sections so as to aid the manufacturing process.

Beneficially the at least one magnetisable core member is formed of strip steel or other ferromagnetic metal alloy, a soft ferrite material or an amorphous or nanocrystalline soft magnetic alloy.

Preferably the arrangement of the at least two magnets causes at least part of the at least one core member to become saturated in normal operation, wherein in a fault condition the magnitude of the AC magnetic field increases from a normal state value to overcome saturation in at least part of the at least one core member such that the AC conductor obtains a higher inductance when a fault condition occurs.

Beneficially the at least one magnetisable core member responds equally to the positive and negative halves of the AC current cycle received by the AC conducting element.

Preferably the at least two permanent magnets recover their original magnetised state on cessation of a fault current event.

The second aspect of the invention can be used for single phase or for multi-phase applications.

Beneficially there is included shielding placed around the magnet to minimise the effects of eddy currents or demagnetisation of the static magnetomotive force source.

The FCL of the second aspect of the invention may be implemented in a circuit or an alternating power system.

In a third aspect of the invention there is provided a fault current limiter comprising:
  at least one magnetisable core member having a void defined therein;
  at least one AC magnetomotive force source configured to generate a varying magnetic flux in at least a portion of the at least one magnetisable core member; and
  at least one static magnetomotive force source being positioned to provide a magnetic circuit within at least part of the at least one magnetisable core member characterised in that the at least one static magnetomotive force source is arranged to extend across the void.

Preferably at least two air gaps are included to section the core member into at least a first and second half.

Beneficially the arrangement of the at least one static magnetomotive force source causes at least part of the first and second halves of the at least one core member to become saturated in normal operation such that saturation in one half of the magnetisable core would be overcome by the positive half of the AC cycle and saturation in the second half of the magnetisable core would be overcome by the negative half of the AC cycle.

Preferably the AC magnetomotive force source is an AC coil wound around each half of the magnetisable core which defines the void.

In a fourth aspect of the invention there is a provided a method of preventing a fault condition in an AC magnetomotive force source positioned relative to at least one magnetisable core member having at least one static magnetomotive force source arranged such that the AC magnetomotive force source and the static magnetomotive force source are relatively positioned to be orthogonal to each other, the method comprising:
  using the static magnetomotive force source to create a magnetic circuit within at least part of the at least one magnetisable core member so as to saturate at least part of the magnetisable core member, thereby providing a low inductance for the AC magnetomotive force source enabling current to flow along the AC magnetomotive force source in normal operation;

producing an AC magnetic field which overcomes the saturation in at least part of the at least one magnetisable core member in the event of a fault condition; and increasing the inductance of the AC magnetomotive force source in the event of a fault condition so as to limit the passage of fault current flowing therethrough.

Preferably the fault current limitation responds equally to either half of the AC cycle.

In a fifth aspect of the present invention there is provided a method of preventing a fault condition in an AC conductive element wound around at least one magnetisable core member having at least two magnets with opposing dipole moment arranged within the at least one magnetisable core member, the method comprising:

creating a magnetic circuit within at least one magnetisable core member;

saturating at least part of the at least one magnetisable core member so as to provide a low inductance for the conductive element enabling current to flow along the conductive element in normal operation;

producing an AC magnetic field which overcomes the saturation in at least part of the at least one magnetisable core member in the event of a fault condition; and increasing the inductance of the conductive element so as to limit the passage of fault current flowing therethrough, characterised in that the magnetic field generated by the conductive element is orthogonal to the magnetic dipole moment of the at least two magnets.

Preferably the fault current limitation responds equally to either half of the AC cycle.

In a sixth aspect of the present invention there is provided a method of preventing a fault condition in an AC magnetomotive force source positioned relative to at least one magnetisable core member having a void defined therein and having at least one static magnetomotive force source arranged to extend across the void, the method comprising:

using the static magnetomotive force source to create a magnetic circuit within at least part of the at least one magnetisable core member, so as to saturate at least part of the magnetisable core member, thereby providing a low inductance for the AC magnetomotive force source and enabling current to flow along the AC magnetomotive force source in normal operation;

producing an AC magnetic field via the AC magnetomotive force source which overcomes the saturation in at least part of the at least one magnetisable core member in the event of a fault condition; and increasing the inductance of the AC magnetomotive force source in the event of a fault condition so as to limit the passage of fault current flowing therethrough.

Preferably there is included at least two air gaps to segment the magnetisable core into at least a first and second half wherein saturation in one half of the magnetisable core would be overcome by the positive half of the AC cycle and saturation in the second half of the magnetisable core would be overcome by the negative half of the AC cycle.

Preferred features relating to the FCL apparatus aspects of the invention may also comprise preferred features in respect of the method aspects of the invention.

According to the most broad aspect, there is provided a fault current limiter (FCL) comprising:
at least one magnetisable core member;
at least one AC magnetomotive force source configured to generate a varying magnetic flux in at least a portion of the at least one magnetisable core member; and;

at least one static magnetomotive force source being positioned to provide a magnetic circuit within at least part of the at least one magnetisable core member.

The broadest aspect of the invention can be characterised by one or more preferred features of the aspects described above or by technical features described in relation to the specific embodiments which follow.

The present invention will now be described by way of example only with reference to the following illustrative figures.

BRIEF DESCRIPTION OF THE DRAWINGS

Prior Art

DETAILED DESCRIPTION OF THE PREFERRED EMBODIMENTS

Figure 1:
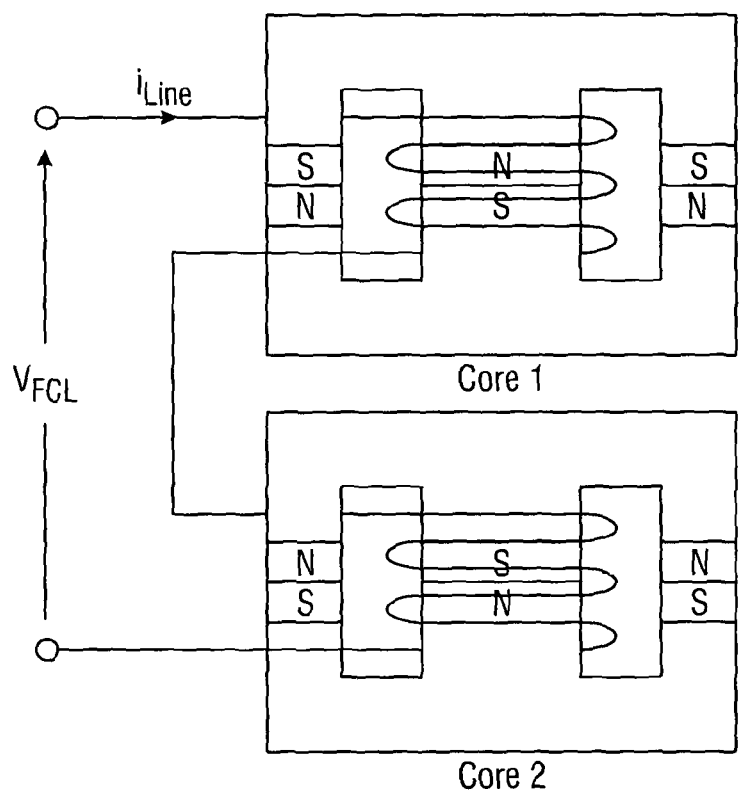
FIG. 1 shows a side view of a Magnetic Current Limiter in accordance with the prior art.
Figure 2A:
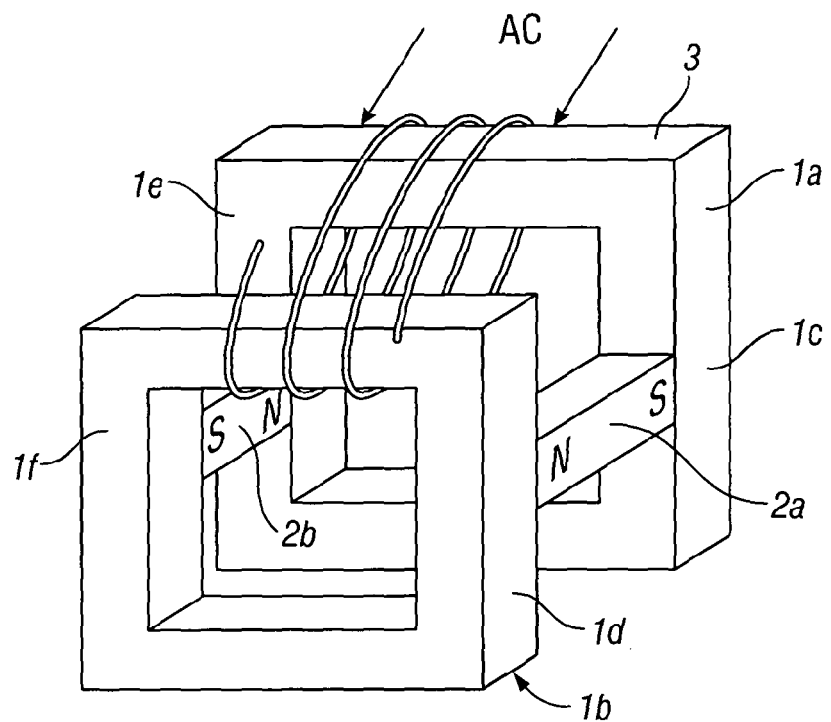
FIG. 2A shows a perspective view of a FCL in accordance with a first embodiment of the present invention and FIG. 2b shows a detail of FIG. 1 explaining bifurcation of the field.
Figure 2B:
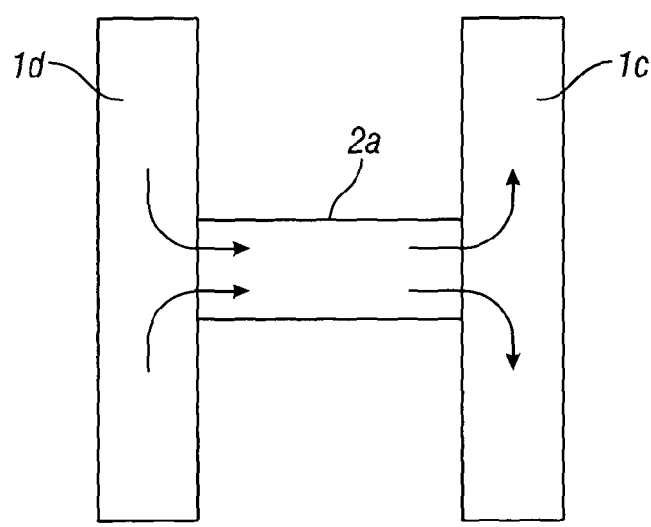

FIG. 2 shows a magnetisable core 1 formed of two core sections 1a, 1b. The first core section 1a has a picture frame shape and the second core section 1b is a mirror image of the first core section. The first and second sections 1a, 1b are arranged in a face-to-face parallel arrangement, the first core section comprises a first closed magnetic circuit and the second core section comprises a second closed magnetic circuit distinct from the first closed magnetic circuit. A first DC magnetomotive force source 2a, for example a magnet, such as a magnet made from permanently magnetic material (hereafter referred to as a permanent magnet) is arranged to bridge the gap between between the two opposing faces of the first and second core sections 1a, 1b, so as to link a first arm 1c of the first core section with a first arm 1d of the second core section. The permanent magnet 2a is also known as a static magnetomotive force source and has a magnetic dipole moment associated with it. It is an advantage of the arrangement of the invention that for the FCL, re-coil of the permanent magnet is not a primary concern since the flux linkage through the magnet during fault helps to maintain the moments of magnets. It is of concern in the case of the prior art shown in FIG. 1 where the moment of the magnets face full force of the AC mmf head on. This is required so that the Fault Current Limiter can automatically reset following a fault current event thereby ensuring that the permanent magnet is not permanently demagnetised. In this embodiment the permanent magnet is one which possesses good re-coil capability such as a rare earth metallic alloy or a hard ferrite. A second permanent magnet 2b possessing a good re-coil capability and having a magnetic dipole moment opposing the direction of the magnetic dipole moment of the first magnet 2a is arranged between the two opposing faces so as to link a second arm of the first core section 1e and a second arm of the second core section 1f.

The first and second permanent magnets 2a, 2b are in a parallel arrangement and the first and second arms 1c, 1d, 1e, 1f are parallel arms in the frame arrangement. The flux set up by the first and second permanent magnets 2a, 2b forms a complete magnetic circuit through the soft magnetic material of the core 1 i.e. a magnetic field flows from the north pole of the first magnet 2a through the first core section 1a to the south pole of the second magnet 2b and the north pole of the second magnet 2b flows through the second core section 1b to the south pole of the first magnet 2a. Therefore the magnetic field flows in opposite directions in the first and second core sections 1a, 1b. The relative geometries of the core sections 1a, 1b and the permanent magnets 2a, 2b are so as to maximise the ratio of magnetic flux interacting to non-interacting volume of the core. Therefore, ideally under normal operating conditions the entire volume of the soft magnetic material of the core 1 remains in the magnetic saturated state.

An AC magnetomotive force source 3, or AC conductive element is wound around a perpendicular arm of the first and second core 1a, 1b in a parallel arrangement so as to provide an AC coil. The AC magnetomotive force source 3 and the static magnetomotive force source 2a,2b are relatively positioned to be orthogonal to each other. Therefore the longitudinal axis of the AC coil is orthogonal (or perpendicular) to the dipole moment of the magnet i.e. the north to south direction of the magnet. Alternatively this can be thought of as the coil being arranged to provide an orthogonal AC field to the DC field generated in the region of the core close to the pole face of the DC magnetomotive force source (e.g. permanent magnet). The important interaction between the AC and DC fields is where there is a parallel interaction between the AC and DC fields within the soft magnetic cores.

Under normal operating conditions the AC current which passes along the AC coil experiences minimal impedance. As current passes along the AC coil a magnetic field in a direction perpendicular to the magnetic moment of the first and second permanent magnet is produced. As mentioned above this may also be defined with respect to the pole face whereby the AC field in the region near to the pole face of the permanent magnet is perpendicular to the DC magnetic field generated by the magnet at the pole face and in the region close to the pole face.

The inductance L of the coil 3 can be approximated with the following equation:

$$L = \mu_0 \cdot \mu_r \cdot N^2 \cdot A / l,$$

where $\mu_0$—permeability of free space (constant), $\mu_r$—relative permeability of the magnetic core 1, N—number of turns of the coil 3, A—cross section area of the coil 3, l—magnetic path length of the coil 3. The N, A and l are linked with the physical design of the coil 3 (inductor) thereby making it relatively difficult to change them gradually over a wide range. The permeability of free space $\mu_0$ is a constant. The relative permeability $\mu_r$ is a measure of how easy the material of the core 1 can be magnetised and it is usually measured for closed magnetic circuits. The $\mu_r$ varies with many factors, the most important being the level of magnetisation and for a ferromagnet material this can vary from tens of thousands (at the peak) to one (at extremely high magnetisation).

Therefore, in normal operation the inductance of the AC coil 3 is low since the core (comprising of the first and second core sections 1a, 1b) is saturated by the presence of the magnetic circuit within the core caused by the magnet arrangement. When a fault condition occurs a high current (a fault current) flows through the AC coil 3 and the magnetic field generated by the AC coil 3 increases in magnitude and becomes strong enough to overcome the magnetic saturation in regions of the core where the AC field and permanent magnetic field interact in opposite directions, i.e. where the fields are subtractive.

For example firstly considering the effect in the first section of the core 1a. When considering the positive half cycle of the AC signal, the magnetic field produced by the AC coil 3 is subtracted from the magnetic field produced by the permanent magnet 2a in the regions where the two fields oppose causing at least part of the region in the first core section to become unsaturated. However, when considering the region of the first core section 1a where the fields are in the same direction the core in this region is driven deeper into saturation, there is no change in the relative permeability $\mu_r$ in this region. Therefore the combined net effect provides a net increase in relative permeability $\mu_r$ which, in accordance with equation 1, provides an increase in the AC coil inductance value. This increase in inductance limits the passage of the fault current through the coil 3.

The second core section 1b functions in the same way, however the saturated and unsaturated portions are reversed compared to that of the first core section 1a. This results from the permanent magnetic fields in the second core section 1b being in opposing directions to those in the first core section 1a.

When considering the effect of the negative half of the AC cycle on the first core section 1a, the first core section now behaves in the same way as the second core section 1b does for the positive half cycle i.e. the regions where the AC magnetic field and the permanent magnetic field coincided previously are now experiencing opposing fields, therefore the two fields subtract to give an unsaturated (or less saturated) region, and the regions which were opposing now coincide (adding to give a more saturated region). The inversion is also applied to the second core element 1b. It is noted that the cyclic nature of the AC current passed through the coil 3 causes the direction of the AC magnetic field to vary (or alternate) whereas the magnetic fields caused by the permanent magnets are fixed in direction, therefore they are said to be DC fields or static fields.

Therefore for both halves of the AC cycle (i.e. the positive and negative parts), the overall effect of the magnetic fault current limiter is an increase in inductance of the AC coil 3 due to an increase in $\mu_r$ of the core (in accordance with equation 1) as a fault current passes through the AC coil 3. Therefore the passage of the fault current can be limited for each half of the AC current cycle.

The use of permanent magnets for the magnetomotive source elements 2a 2b can be extremely beneficial in that there is no requirement to use superconducting systems or electromagnets that require significant power supply. The concern with the use of permanent magnets is their potential de-magnetisation during a fault current event and the result that the FCL would thereafter not re-set to a usable state. This concern is ameliorated by the way in which the permanent magnets are incorporated into the magnetic circuit of the device. Although the permanent magnets 2a, 2b may experience brief periods of demagnetisation, they are not easily permanently demagnetised and 'spring back' or 're-coil' into the original (or default) magnetised state following a fault current event.

The static magnetomotive force sources (permanent magnets 2a, 2b) are positioned to provide a bifurcated magnetic field in the core 1a, 1b in which the field direction in the same core member branches in opposed directions at the junction with the static magnetomotive force source (permanent magnets 2a, 2b). This is shown most clearly in FIG. 2A. This bifurcation of the static magnetic field at the junction with the core members, particularly where permanent magnets are used to bridge the gap between core members, provides protection against de-magnetisation of the static magnetomotive force source, during a fault current event. The arrangement provides common mode rejection of the AC field across the poles of the static magnetomotive force source. Such an arrangement is not disclosed in, for example WO2007029224.

The use of one or more pairs of permanent magnetomotive force sources to bridge the gap between core members provided benefits also in that a low reluctance DC flux path is provided to aid saturation and protection of the magnets, whilst at the same time allowing high levels of flux linkage through the magnetic circuit to give good current limiting inductance during a fault. The ability to include magnets distributed in this way provides distributed DC mmf around the magnetic circuit, aiding core saturation.

The implementation of shielding 4a, 4b, for example copper shims or plates (shown in FIGS. 13 and 14) arranged around the electrically conductive permanent magnet 2 prevents eddy current heating in the permanent magnet 2 by reducing the direct action of the AC field on the permanent magnet 2 which also helps to prevent or minimise permanent demagnetisation. The eddy current effect is represented by the arrow within the shielding in FIG. 14.

Figure 3:
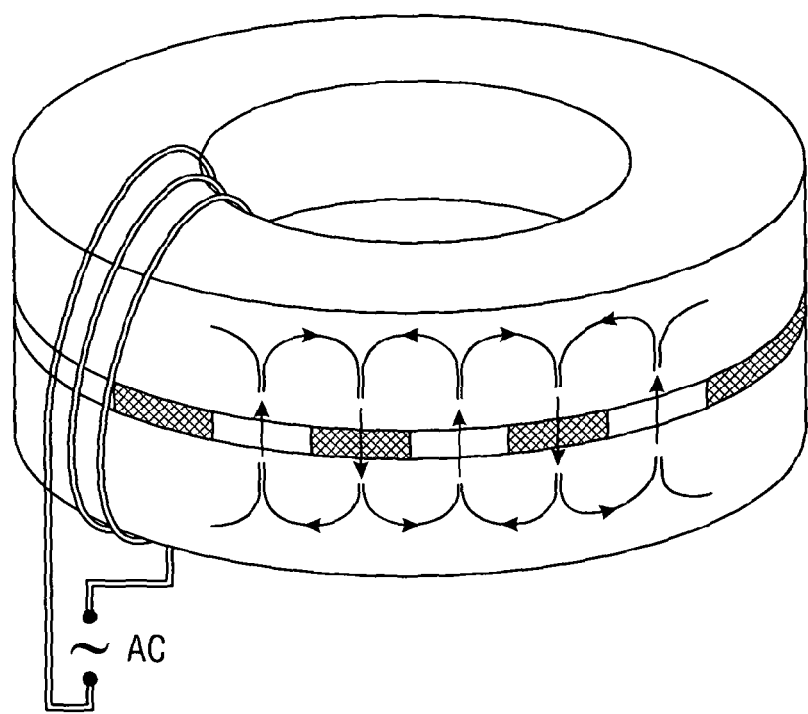
FIG. 3 shows a perspective view of a FCL in accordance with a second embodiment of the present invention.

FIG. 3 shows a core consisting of a series of permanent magnets 2 arranged in the form of a ring and sandwiched between two soft magnetic ring cores 1a, 1b. The side edges of the permanent magnets are in contact with the side edge of its neighbour permanent magnet and the magnetic moments (indicated by the bold arrow) of adjacent magnets are in opposite directions.

A coil 3 is wound around the whole core 1 which includes 1a and 1b such that the direction of AC flux is along the circumferential direction of the core 1 and orthogonal to the moments of the permanent magnets 2. The flux set up by adjacent permanent magnets 2 forms a complete magnetic circuit through the soft material of the core 1 above and below the ring of magnets 2. The relative geometries of the permanent magnets 2 and core members 1a, 1b (in this instance the core members are rings of soft core material) are such that the entire core 1 is saturated under normal operating conditions by the magnetic circuit provided by the magnet arrangement, so as to keep the inductance of the coil 3 at a minimal value. Under fault conditions the saturation is overcome in regions of the core 1 so as to give the core 1a higher net relative permeability so as to increase the inductance of the AC coil 3.

For example, in the event of a fault condition the regions in the core where the DC/static magnetic field generated by the permanent magnet coincides with the AC magnetic field, the two fields are additive, thereby causing the core in these regions to saturate even deeper. However, in the regions where the DC/static magnetic field and the AC magnetic field oppose (i.e. flow in opposite directions) the AC field is subtracted from the permanent magnetic field and the core in these regions becomes less saturated and may even become unsaturated when the magnitude of the AC fault current is high. The net permeability of the core 1 is therefore increased causing the inductance of the coil 3 to also increase so as to prevent and/or limit the passage of fault currents through the AC coil 3. Since the AC signal is cyclic (having positive and negative half cycles) the AC magnetic field is caused to vary its direction depending on the half cycle and the direction of the magnetic field varies (or alternates) between opposing circumferential directions. Therefore, the regions of the core where the DC/static and AC magnetic fields were previously additive are now subtractive and vice versa. The symmetry of the system, therefore enables the core to provide the current limitation for either half of the AC current cycle and eliminates the need for two separate devices each dealing with only one half of the cycle (as is the case in FIG. 1).

Figure 4:
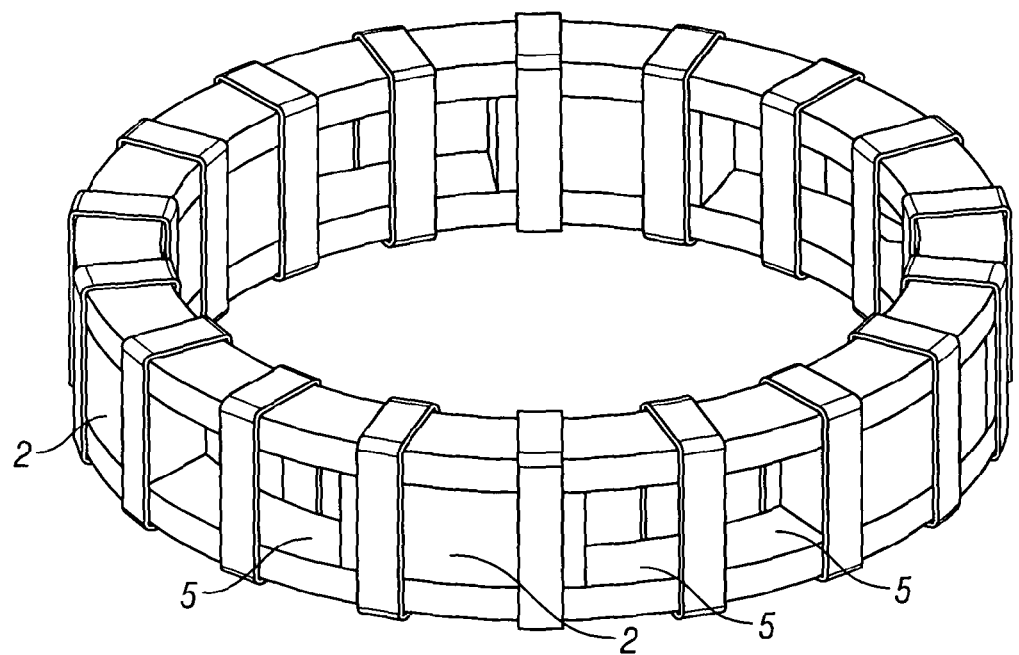
FIG. 4 shows a perspective view of a FCL in accordance with a third embodiment of the present invention including air gaps arranged between the magnet pair.

FIG. 4 shows air gaps 5 arranged between the series of rare-earth magnets 2 of FIG. 3. Air has a permeability of several orders of magnitude lower than the permeability of ferromagnets and ferrimagnets used for the magnetic cores.

Figure 5A:
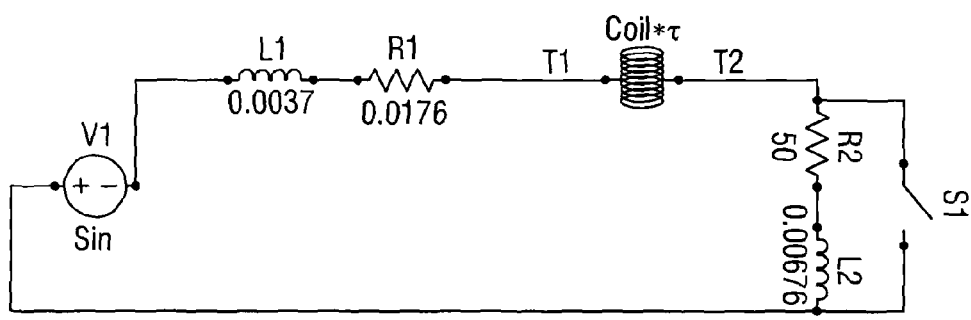
FIG. 5a shows the electric circuit used in the simulations and 5b shows the results of the simulation of the FCL arrangement of FIG. 4.

The device operates in the same way as the device in FIG. 3, however the inclusion of the air gaps 5 prevents the magnetic flux from short circuiting. The Permanent Magnetic FCL (PMFCL) of FIG. 4 was modelled using a 3D non-linear transient simulation solver so as to simulate the transient effect of the PMFCL. The parameters of the model were as follows:

Firstly Considering the Core:
Inner diameter—200 mm
Outer diameter—280 mm
Height—15 mm
Material type—Soft Magnetic silicon steel M4
Next Considering the Permanent Magnet:
No. of poles: 6 equally spaced
Inner diameter: 200 mm
Outer diameter: 280 mm
Height: 30 mm
Material type Neodynium Iron Boron: 34/22
Electric resistivity: 1.5e-006 Ωm
Finally Considering the AC Coil:
Number of turns: 20 turns
Total number of turns in the whole coil: 50
Material type: copper The PMFCL modelled is shown in FIG. 4. The PMFCL is coupled to an electric circuit in which a defined sinusoidal voltage source is connected to the PMFCL and load. The circuit is shown in FIG. 5a. The current in the circuit is calculated by software according to the circuit parameters. To simulate the short circuit effect, a switch 6 is connected in parallel across the load 7. The model is solved when the switch 6 is open and the current in the circuit is calculated at each time step. At a defined instant the switch 6 is closed leading to a short circuit of the load so as to simulate the fault condition. The transient current is determined according to the permanent magnet fault current limiter parameters. The width of the soft steel core 1 of FIG. 4 has been selected to be 15 mm so as to achieve full saturation throughout the volume of the core material.

Figure 5B:
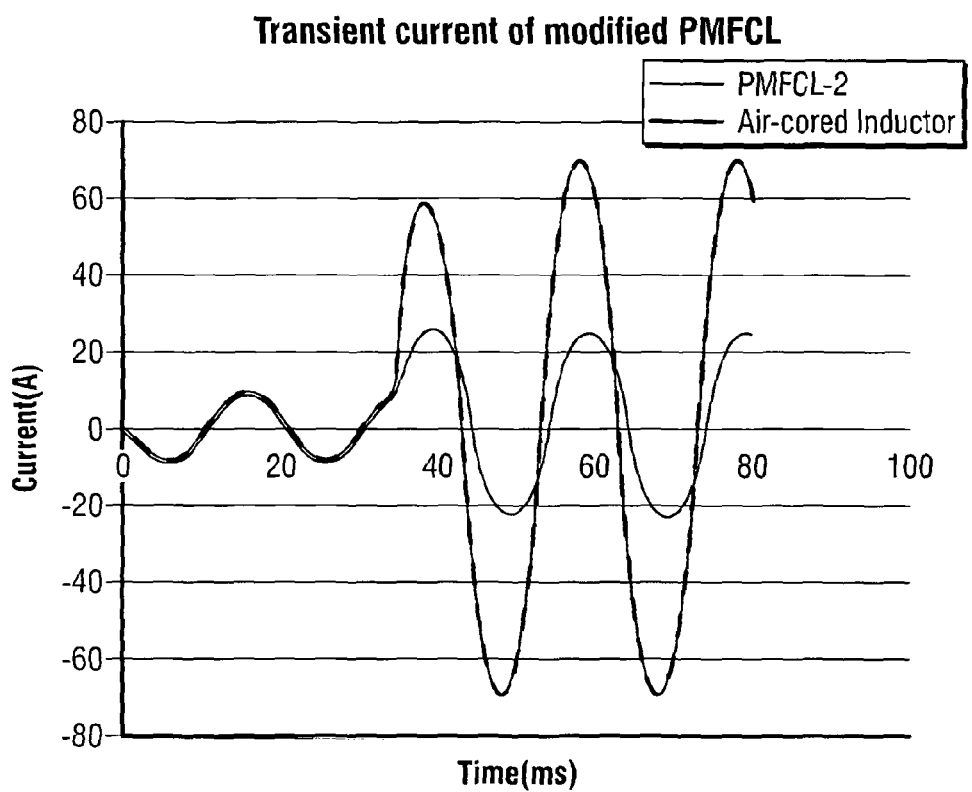

FIG. 5b shows a 3D, non-linear, time-step solution for the model of FIG. 4. The current was calculated at each time step prior to and after closing the switch. The graph displays transient current against time for the PMFCL and an air cored inductor (which is used as a comparison model). The results show a clear attenuation of the circuit current due to the presence of the PMFCL when compared to the air-cored inductor, whereby the maximum peak is in the region of 25 A compared to 70 A.

Figure 6:
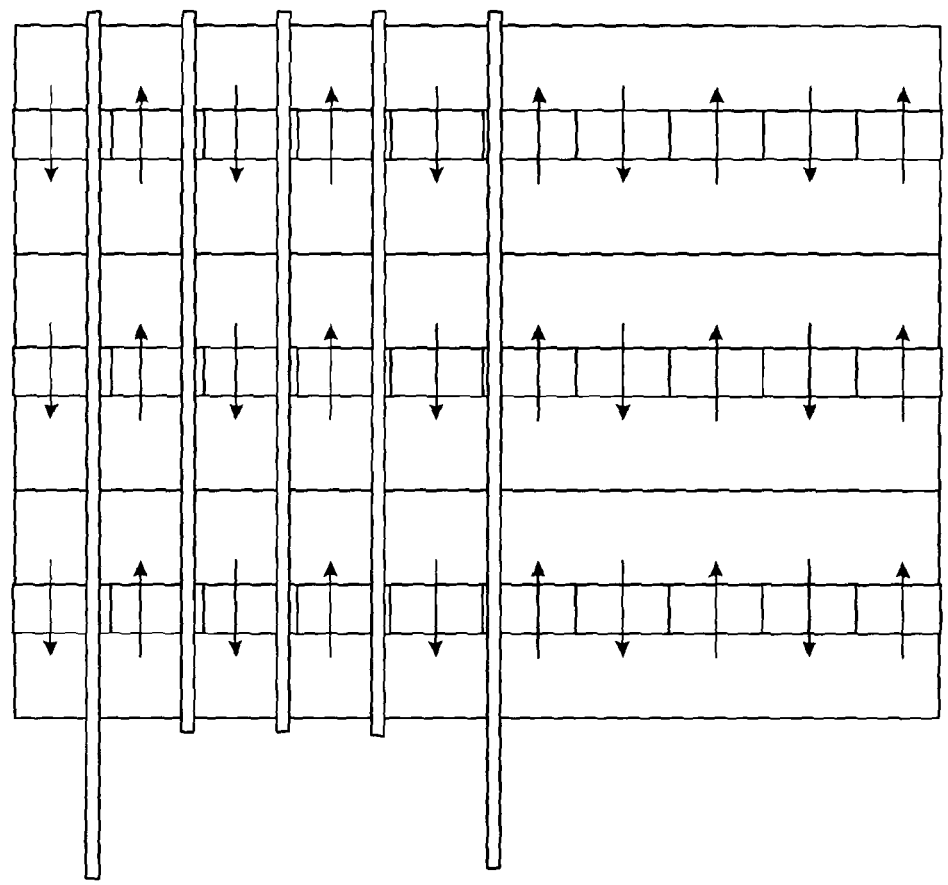
FIG. 6 shows a side view of a FCL in accordance with a fourth embodiment of the present invention.

FIG. 6 shows a stacked PMFCL arrangement where multiple rings of FIGS. 3 and 4 are stacked one on top of the other with the AC coil 3 wound around the cores 1 in a parallel arrangement. The arrows in FIG. 6 represent dipole moments of the respective magnets 2.

Figure 7:
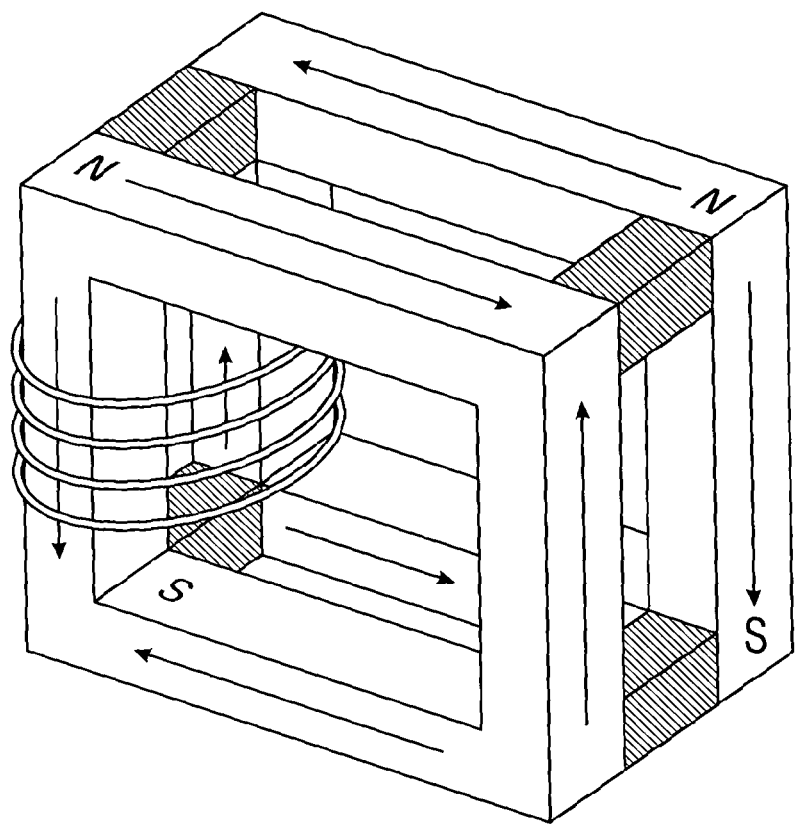
FIG. 7 shows a perspective view of a FCL in accordance with a fifth embodiment of the present invention for use in a single phase arrangement.

FIG. 7 shows a single phase arrangement with a first soft magnetic picture frame shaped core 1a and a second soft magnetic picture frame shaped core 1b. The second core is a mirror image of the first core and they are arranged face-to-face in a parallel configuration. A permanent magnet 2a having a magnetic dipole moment perpendicular to the parallel face of the cores is arranged between the first corner of the first core 1a and the first corner of the second core 1b and a second permanent magnet 2b, also having a magnetic dipole moment perpendicular to the parallel face of the cores, is arranged between the second corner of the first core 1a and the second corner of the second core 1b. A third and fourth permanent magnet 2c,2d are also arranged between the third and fourth corners of the first and second cores 1a, 1b respectively.

The magnetic moments of adjacent permanent magnets (e.g. the first and second magnets 2a, 2b) are arranged in opposite directions. The flux set up by the first and second permanent magnet 2a, 2b forms a complete circuit with the two permanent magnets through the magnetisable core material 1 i.e. a magnetic field flows from the north pole of the first magnet 2a through the first arm of the first core 1a to the south pole of the second magnet 2b and a field flows from the north pole of the second magnet 2b through the first arm of the second core 1b to the south pole of the first magnet 2a. Therefore the magnetic field flows in opposite directions in the first arms of core 1 and core 2 1a, 1b. The same process occurs with the remaining arms of the double frame structure. The relative geometries of the core sections 1a, 1b and the permanent magnets 2a, 2b, 2c, 2d are such that under normal operating conditions the soft magnetic material of the core 1 remains saturated caused by the magnetic circuit generated by the permanent magnet arrangement.

An AC coil 3 is wound around the first and second cores 1a, 1b so as to provide a magnetic field in a direction perpendicular to the magnetic moment of the first, second, third and fourth permanent magnets 2a, 2b, 2c, 2d.

In normal operation the inductance of the coil 3 is low since the first and second cores 1a, 1b are saturated by the DC/static fields generated by the permanent magnet arrangement. When a fault condition occurs a high current (a fault current) flows through the AC coil 3 and the AC magnetic field generated by the AC coil 3 (that flows through the first and second core 1a, 1b) increases in magnitude and becomes strong enough to overcome the saturation in regions of the cores.

For example, firstly considering the effect at the first arm of the first and second cores 1a, 1b; when considering the positive half cycle of the AC signal, the magnetic field produced by the AC coil 3 is subtracted from the magnetic field produced by the permanent magnet 2, therefore at least part of the region in the first arm of the first core 1a becomes unsaturated. However, when considering the first arm of the second core 1b during the positive half-cycle of the AC signal the first arm of the second core 1b gets saturated even deeper, with its impedance not changing. The overall effect is an increase in inductance of the AC coil 3 due to a net increase in $\mu_r$ of the core (in accordance with equation 1) and an increase in inductance limits the passage of the fault current through the coil 3. When considering the negative half of the cycle the region in the first arm of the second core 1b becomes unsaturated and the first arm of the first core 1a becomes saturated again. Therefore, the overall effect is an increase in inductance of the AC coil 3 due to a net increase in $\mu_r$ of the core 1 (in accordance with equation 1). Consequently, this arrangement responds to either half of the AC cycle.

Figure 8:
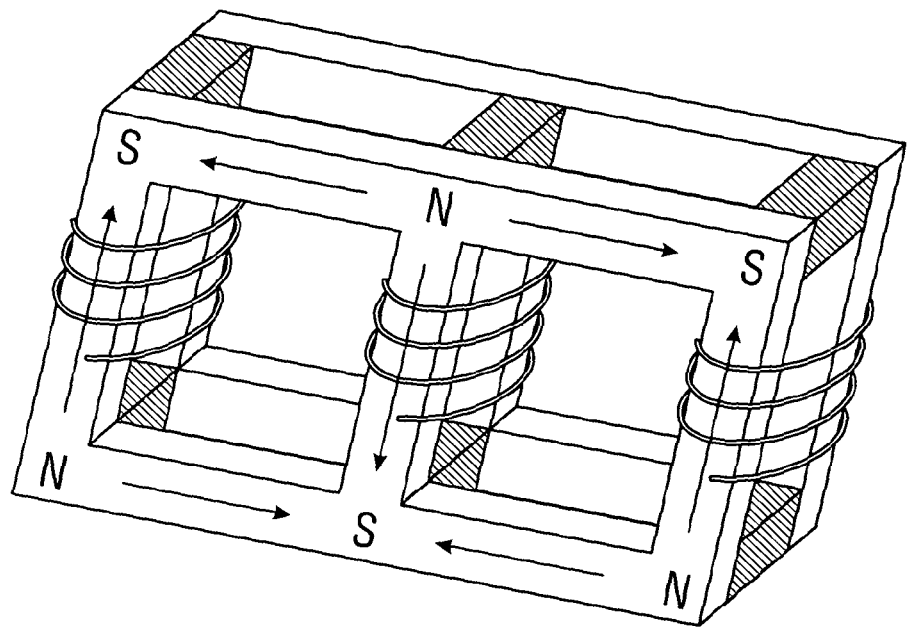
FIG. 8 shows a perspective view of a FCL in accordance with a sixth embodiment of the present invention for use in a three phase power system.

The three phase PMFCL has a more complicated configuration of the magnetic core 1. A popular core design for a three-phase transformer is the three-limb core shown in FIG. 8 having a first section and a second section 1a, 1b. The AC coils 3a, 3b, 3c are placed on the three limbs of both sections or the core 1a, 1b (shown extending vertically in FIG. 8).

Figure 9:
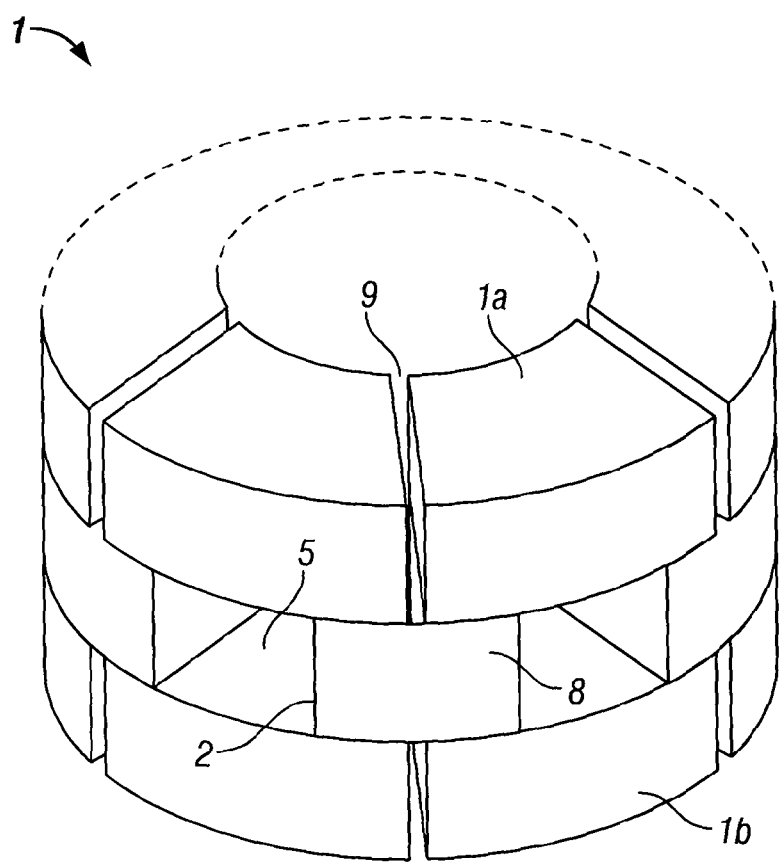
FIG. 9 shows a perspective view of a section of the core and magnets in accordance with a seventh embodiment of the invention.

FIG. 9 shows the core 1 and magnets 2 of the FCL where an air gap 5 is firstly positioned along the circumferential direction so as to provide a space between the adjacent permanent magnets to reduce the DC magnetic flux short circuit, whereby the permanent magnets are arranged between a first and second section of the core. Secondly an air gap 9 is positioned within the first and second (or upper and lower) core members at the mid point above and below each permanent magnet i.e. the mid-point above the pole faces 8 so as to divide a core section 1a, 1b into two further parts. The use of air gaps 9 along the circumferential direction of the soft magnetic core advantageously increases the AC field reluctance of the soft magnetic cores in order to avoid very large AC fields (which are generated by very large fault currents) from driving the core back into saturation which would curtail the current limiting liability of the FCL. It is also important not to increase the DC flux path and this can be achieved by placing the air gaps 9 at the mid-point above and below the pole faces of the permanent magnets at the region of DC bifurcation. This feature has been found to greatly enhance the performance of the device by extending the working fault current limiting range.

Figure 10:
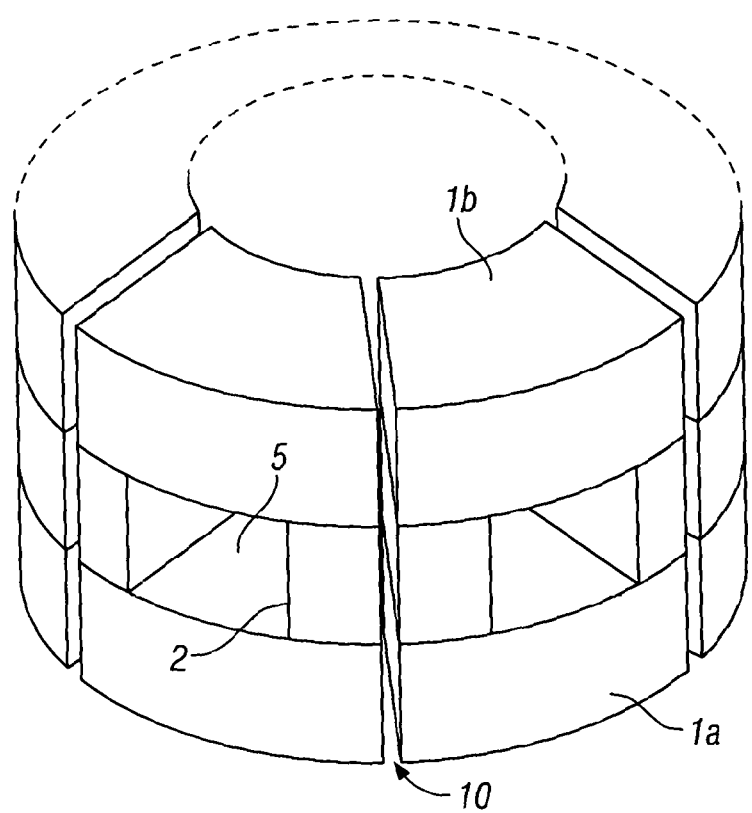
FIG. 10 shows a perspective view of a section of the core and magnets in accordance with an eighth embodiment of the invention.

FIG. 10 shows the air gap 10 extending through the permanent magnet. This has the advantage of minimising the effect of demagnetisation created by the free poles in FIG. 9 and thus reducing the reluctance in the DC flux path, thereby aiding saturation of the soft magnetic cores in the regions between the magnets and also permits the cores to be constructed in sections so as to aid the manufacturing process.

Figure 11:
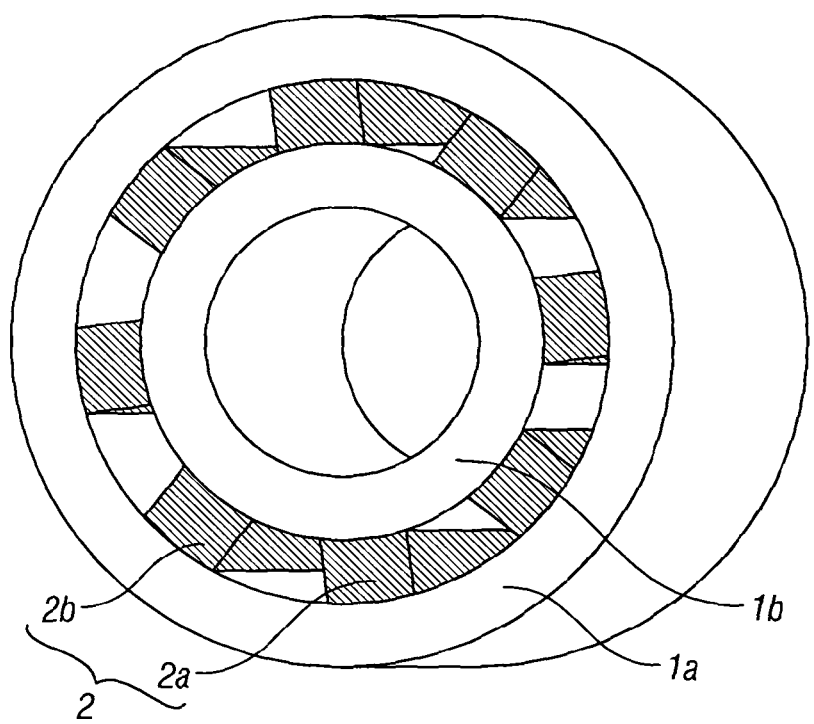
FIG. 11 shows a perspective view of the core and magnets arranged concentrically

FIG. 11 shows an FCL core with soft magnetic rings 1a, 1b and permanent magnets 2 arranged as annular rings. The air gaps 5, 9, 10 of FIGS. 9 and 10 can also be included in this structure. The AC windings (not shown) are wound around the core with the AC field in the circumferential direction, perpendicular to the magnetic moment of the permanent magnet.

Figure 12:
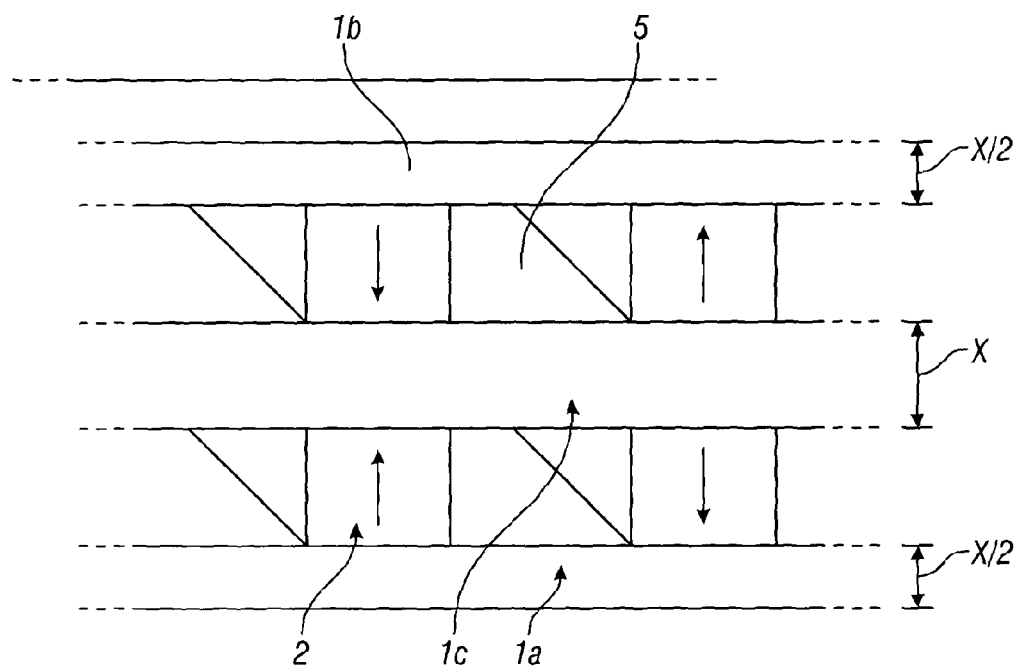
FIG. 12 shows a section of the core and magnets having two outer core elements and an internal core element.

FIG. 12 shows a section of an FCL core. The central soft magnetic core 1c has a thickness double that of the outer cores 1a, 1b so as to allow the DC flux density to be equal since the permanent magnets 2 above and below act on the central core 1c. The AC windings (not shown) are wound on the central soft core 1c only in the spaces 5 between the magnets 2 so as to allow this core structure to be stacked above and below.

Figure 13:
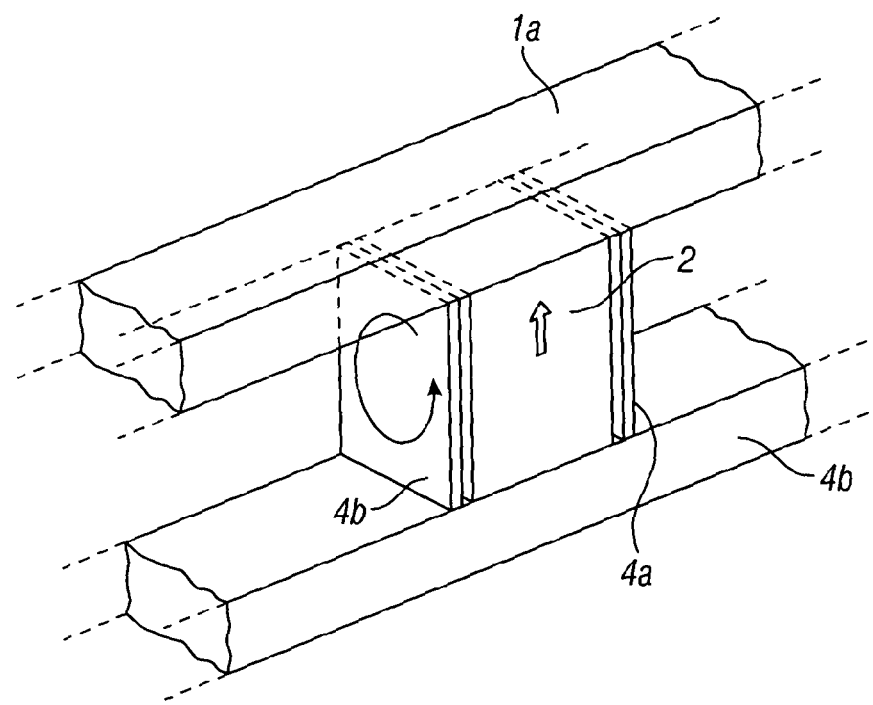
FIG. 13 shows a first arrangement of conductive plates.

FIG. 13 shows a section of an FCL core where electrically conductive plates 4a, 4b have been placed either side of a permanent magnet 2, facing the direction of the AC field. The AC windings (not shown) enwrap the entire cross section of the structure producing a field in the longitudinal/circumferential direction of the soft magnetic cores, depending on the core structure, or alternatively could be arranged as shown in FIG. 12. Eddy currents would be generated in the plates (represented by the arrow in the conductive plates) which generate a partially cancelling magnetic field in the opposite direction (in accordance with Lenz's Law) and therefore serves to protect the permanent magnet from the demagnetising effect of the AC field.

Figure 14:
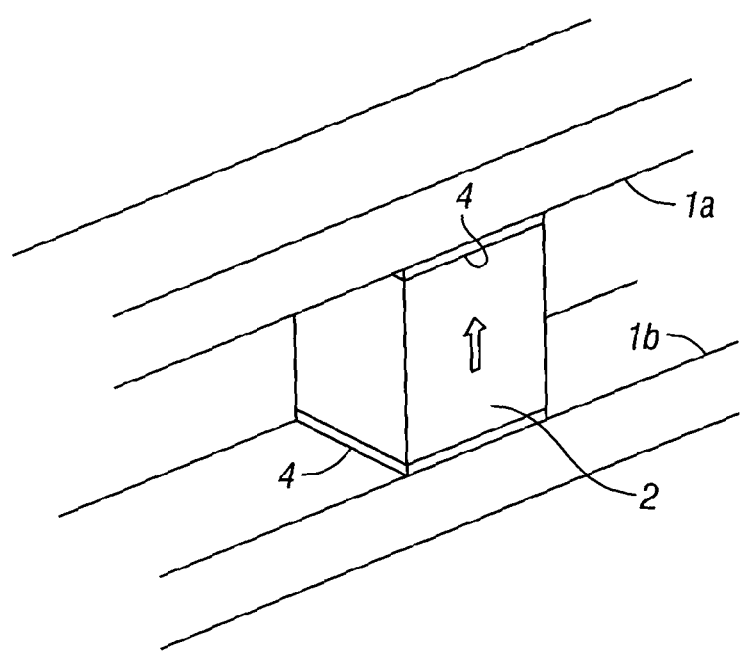
FIG. 14 shows a second arrangement of the conductive plates.

FIG. 14 shows conductive plates 4 being positioned above and below the permanent magnet 2 in order to shield the magnets from any component of the AC flux which may leak from the soft magnetic cores 1a, 1b.

Figure 16:
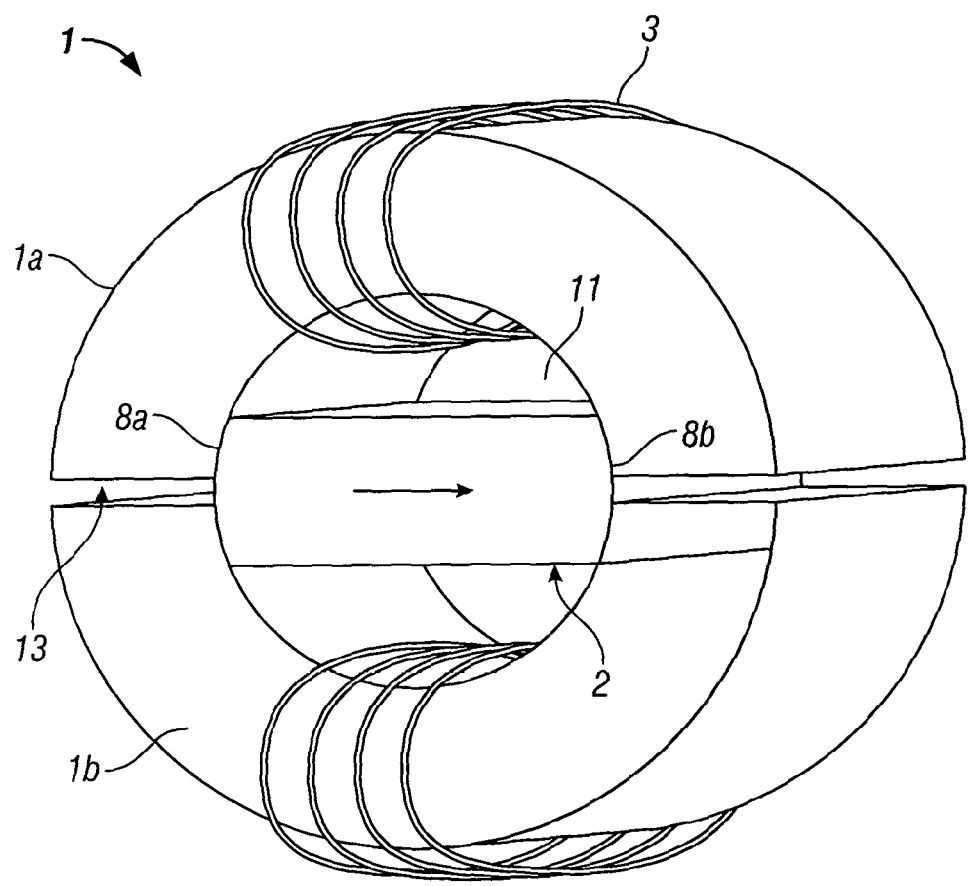
FIG. 16 shows a perspective view of the FCL in accordance with a ninth embodiment.

FIG. 16 shows a development of FIG. 11 whereby the inner soft magnetic ring has been reduced to zero. Therefore the magnetisable core member defines a void region 12 so as to form an annulus and the permanent magnet 2 now extends across the void 12 of the annulus 1 such that the north and south ends of the permanent magnet make contact with the inner edge of the annulus. The core member is separated into two halves (or a first and second member) 1a, 1b by gaps 13 which extend from the internal surface of the annulus 1 to the outer surface of the annulus 1 at the mid-point of the south and north poles of the magnet, i.e. from the mid-point of the pole faces 8. Alternatively, the core need not have gaps or the gap could extend through the full length of the permanent magnet. The permanent magnet arranged in this way causes at least a part of the first and second members 1a, 1b of the core structure (or annulus) to become saturated in normal operation.

The AC windings 3 are configured such that the AC fields "chase" each other. In such a case, and in the event of a fault condition, one half of the soft core 1a is driven further into saturation whilst the other half 1b is driven towards sub-saturation. Therefore in the event of a fault current, one half of the core 1 will be driven out of saturation causing the inductance to increase so as to limit the fault current to a safe level. The core 1 would react equally to either half of the AC waveform i.e. the positive half of the AC cycle would overcome saturation in one half of the magnetisable core and the negative half cycle would overcome saturation in the second half of the magnetisable core. The core is capable of resetting automatically following the fault event. This design can lead to an increase in flux leakage compared to an FCL core where the permanent magnetic material is more spacially distributed.

Figure 17:
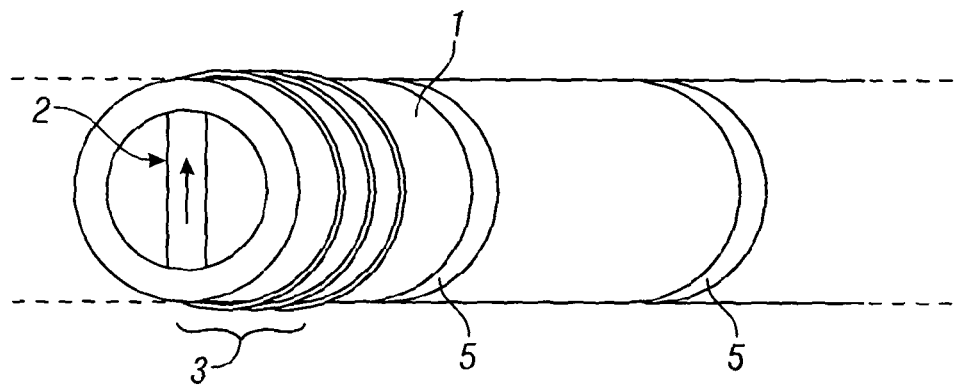
FIG. 17 shows a perspective view of the FCL in accordance with an tenth embodiment of the invention.

FIG. 17 shows a similar core to FIG. 16, but in this case the AC windings 3 are placed around the outer circumference of the soft magnetic core 1. The section can be combined with other sections so as to form a torus and can be assembled in sections with an air gap 5 between each section. The air gap would increase the reluctance of the AC field direction whilst at the same time not affecting the DC flux path.

Figure 18:
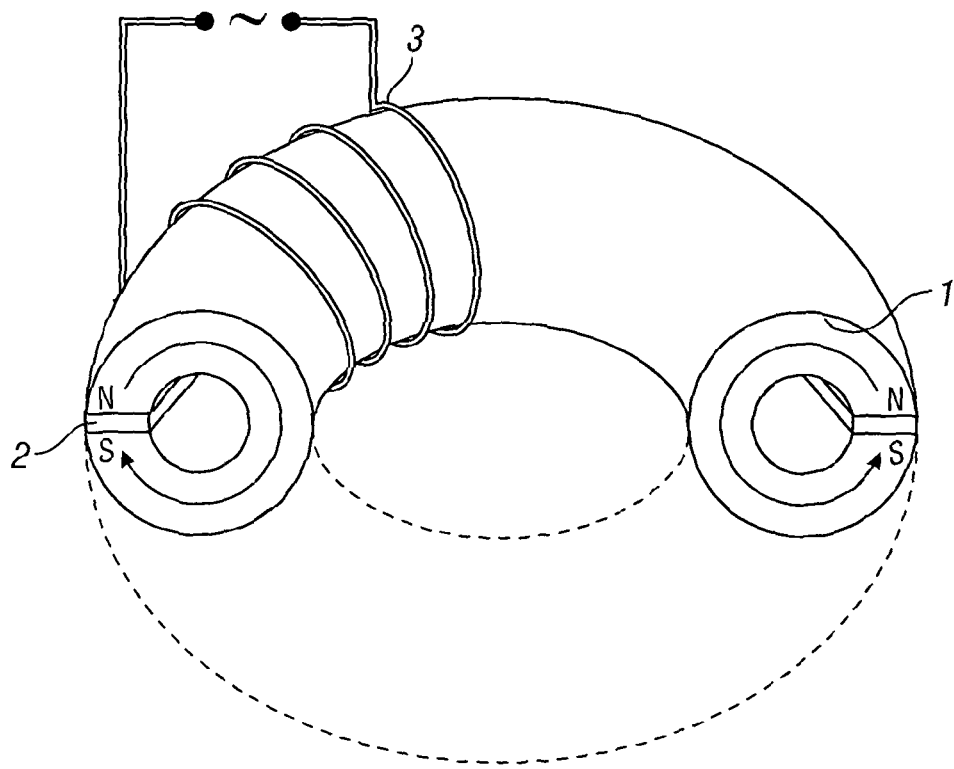
FIG. 18 shows a perspective view of the FCL in accordance with an eleventh embodiment of the invention.

FIG. 18 shows a cross section through a torus core 1. The DC flux path acts in an orthogonal direction to the AC flux. Air gaps (not shown) can be inserted at intervals along the circumferential path length of the torus 1. A permanent magnet 2 extends from the interior of the torus to the exterior of the torus throughout the torus structure.

In the arrangements of FIG. 17 and FIG. 18 the DC flux and the AC flux interaction is orthogonal rather than parallel and may be more suited for applications such as a low loss transformer core. In this arrangement the domain re-orientation is by rotation only rather than domain wall movement followed by moment rotation (at low and then high fields respectively).

Hysteresis is associated only with the pinning of domain walls during wall movement and so this component of loss would not exist or be greatly reduced in the core of this FCL arrangement.

It will be appreciated that in further embodiments various modifications to the specific arrangements described above and shown in the drawings may be made. For example the permanent magnets can be embedded in a core formed of one single core section, whereby the magnets may be inserted into slots or other forms of recess.

The core member may be formed of strip steel or other ferromagnetic metal alloy, a soft ferrite material or an amorphous or nanocrystalline soft magnetic alloy.

The AC coil may be wound around the core in multiple configurations so as to provide an AC magnetic field which is orthogonal to the magnetic dipole moment of the core, for example when considering the embodiment of FIG. 2, the coil can also be wound around the first core then the second core in a series arrangement or instead the coil may be wound around both the first and second portion in a parallel arrangement described previously. Also the permanent magnets in the embodiment of FIG. 2, or equivalent embodiments, may be positioned at any point between the core arms as long as they form a magnetic circuit in the core. The positioning of the magnet pair may not need to form a symmetrical arrangement. The core can be wound around each arm pair of the core or only a single arm pair.

Eddy current heating in the electrically conductive permanent magnets may also be prevented by replacing the copper shims with another shielding means. For example the soft iron core itself may be laminated or formed using bonded compacted powders. Samarium Cobalt (SmCo) materials can be selected to give better performance at high temperatures with respect to Neodymium-Iron-Boron based rare earth alloys. Alternatively, when considering the ring arrangement the permanent magnets can be spaced apart by regions of the magnetic core (and not the magnets) and the AC windings can be wound only over the soft magnetic cores so as to reduce eddy currents and to reduce the length of the conductor required in the windings. In a further embodiment the rare earth magnet may not require the use of a shielding means.

Disc, toroidal and picture frame core designs have been presented above. The picture frame shaped core can be formed by cutting the core material or, alternatively a picture frame shaped core can be formed by winding a magnetic material on a former, however this method results in a picture frame core having more rounded corners in comparison with the previous picture frame core. Alternative core designs may be used in the present invention. The magnetic material may be in the form of a lamination, film, strip, tape, ribbon, wire or the core may be formed by sintering pressing.

Figure 15A:
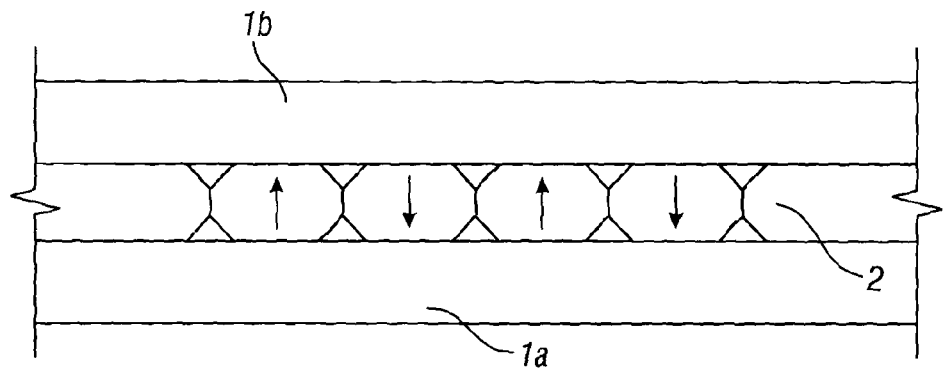
FIGS. 15a, 15b and 15c show a variety of shapes for the magnets in the FCL.
Figure 15B:
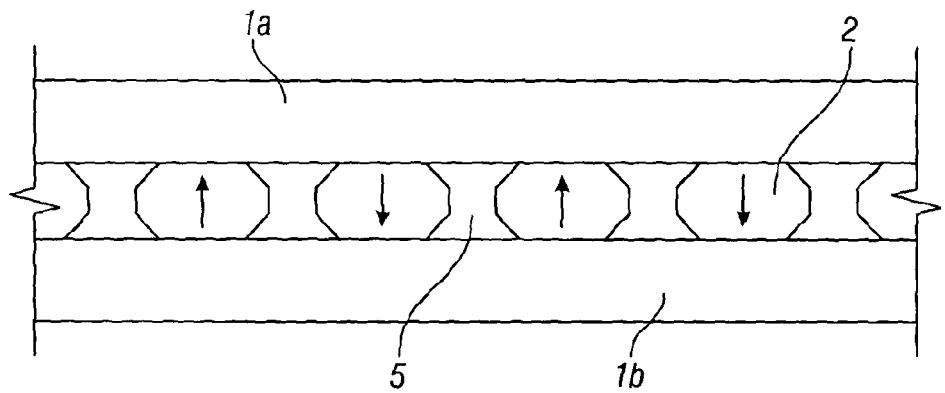
Figure 15C:
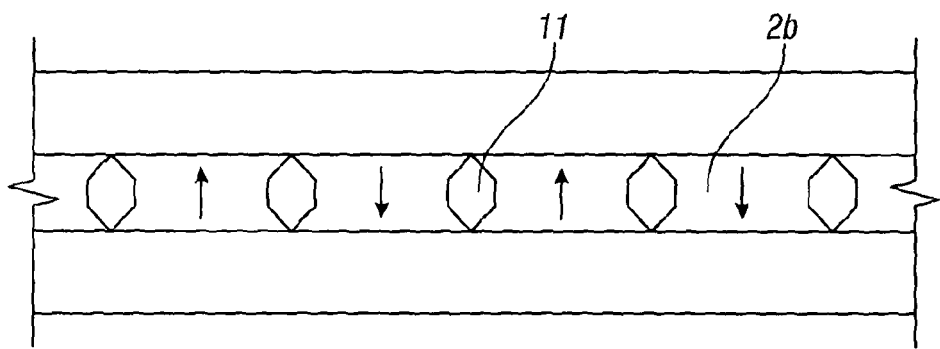

It is clear that other core cross sections are suitable for use in the present invention and may include rectangular, circular, cruciform or cross-shaped, orthogonal and triangular. FIG. 15 further demonstrates that the shapes of permanent magnet 2 may also be varied. FIG. 15 (a) shows the case where the permanent magnets 2 are placed side-by-side with no gaps, (b) shows the permanent magnets 2 spaced by the air gaps 5 and (c) shows the arrangement where parallel sided gaps 11 are spaced at intervals within a continuous permanent magnet structure 2b. Different profiles may be selected in order to optimise the path of the DC flux in the soft magnetic cores so as to maximise the volume of soft magnetic material which is held at, or near, saturation.

Instead of a stacked arrangement of core members, a chain arrangement comprising a plurality of core elements, each defining a central aperture, the core elements being joined together in order to create a closed magnetic circuit may be applied. The AC coil may be wound around each of the linked arm pairs in a series arrangement. The magnetic material may be in the form of a lamination, film, strip, tape, ribbon or wire or the core may be formed by sintering or pressing.

The permanent magnet need not be made from electrically conducting rare-earth materials which possess a good re-coil capability. Alternatively, hard ferrites which are non-conducting oxides can be selected for the permanent magnet. This is a good alternative because it is considerably cheaper than the high energy rare-earth magnets and removes any need for the shims or plates to be implemented. However the size of the Fault Current Limiter for a given rating where hard ferrites are implemented would be substantially larger than when electrically conducting rare-earth materials which possess a good re-coil capability are implemented.

When considering FIG. 3 it is clear that the permanent magnets may be placed side by side such that the magnets are in contact with each other, however this can provide a lack of DC flux into the soft magnetic core and would require the soft magnetic cores to be thinner in order to get saturation. Therefore by separating the permanent, magnets by air gaps the DC flux follows paths through greater sections of the soft magnetic core. Optimum separation of magnets will depend on magnetic characteristics of soft and permanent magnetic materials and core geometry. The second type of air gap, which has a minimal effect on the DC flux can extend through the soft magnetic core sections only or it may extend through the core sections and the length of the permanent magnet. The second air gap in the soft core need not be present in the FCL arrangement.

When considering FIGS. 9 and 10 it is clear that wider air gaps may be implemented, however modelling has shown that the arrangement of the air gaps as shown in FIGS. 9 and 10 may provide a greater advantage to the avoidance re-saturation by very large fault currents. However as described previously there may be air gaps within the core positioned at the mid-point of every permanent magnet, or alternatively at the mid-point of just some. The air gaps may or may not all be the same length. The width of the air gaps may be a set value, or could be altered at a later date so as to suit the particular application of the Fault current limiter.

A development of the core configuration shown in FIG. 11 could be made in which the AC windings are wound around the circumference of the outer soft magnetic ring and the core (similar to the embodiment of FIG. 17) and whereby the core is assembled in sections similar to that shown in FIG. 16. Further air gaps could be inserted between each section.

In the previous embodiments the AC coil is wound around the complete Fault Current Limiter core comprising the soft (the core) and the hard (the permanent magnet) components, however the AC windings can be wound around the soft magnetic core 1 only in the region of the soft magnetic core where the saturation is to be achieved, rather than just in one location or remote from this, or these, regions. This beneficially reduces the flux leakage from the soft cores.

Figure 19:
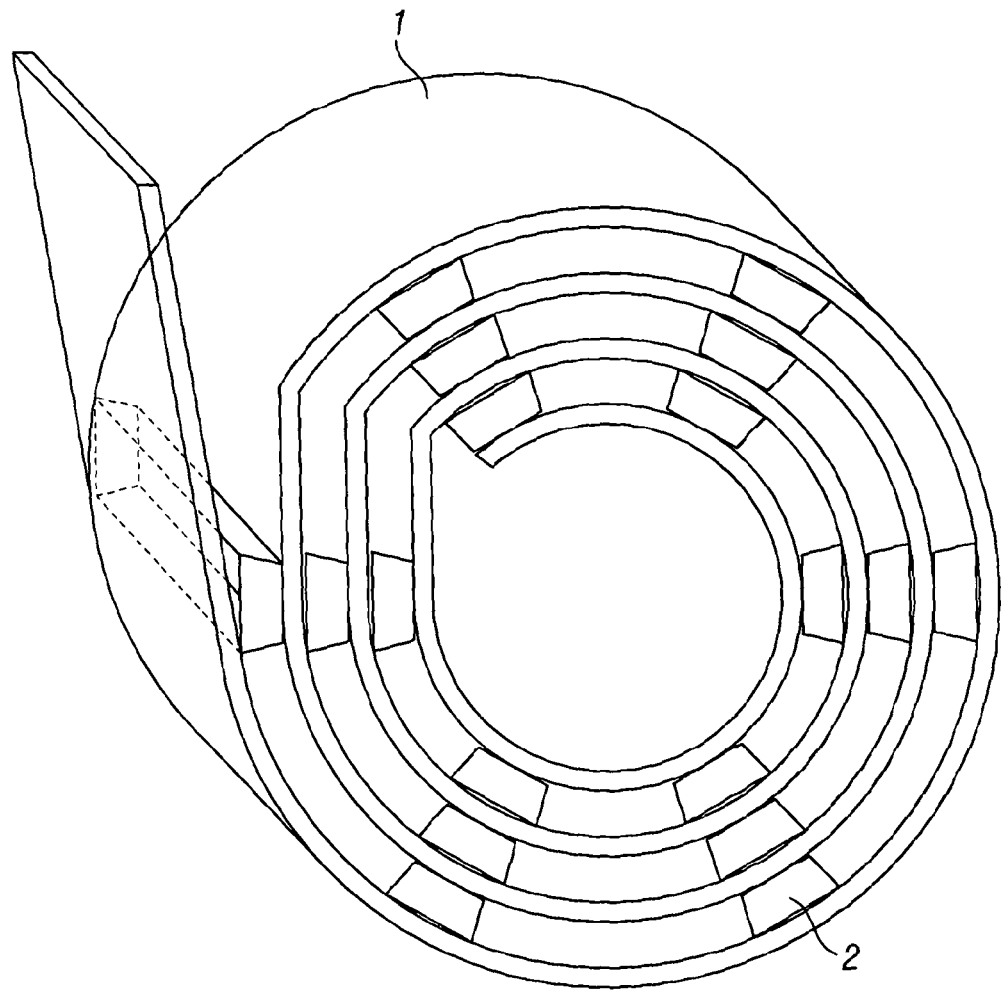
FIG. 19 shows a wound construction of the core.
Figure 20:
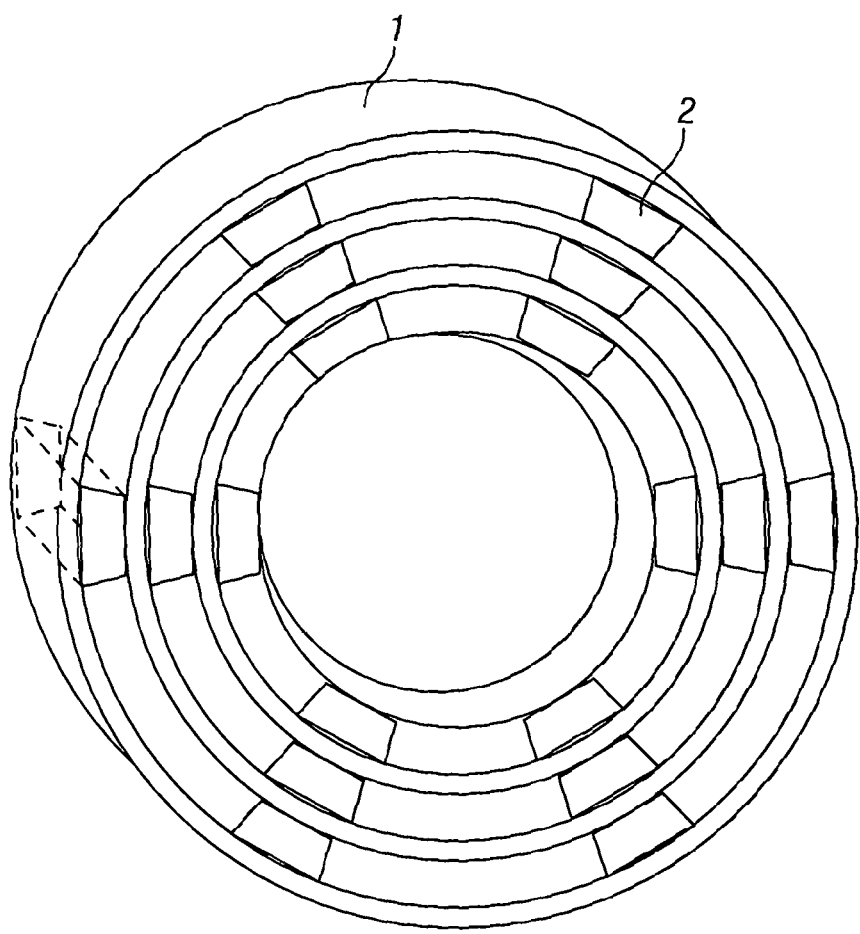
FIG. 20 shows the concentric construction of the core.

FIG. 19 shows a wound construction of the core 1 and magnet structure 2 which offers an alternative method of construction in which a more automated winding of the core could be envisaged. FIG. 20 shows the concentric ring construction which is similar to FIG. 11 but in this case shows a greater number of core rings 1 having permanent magnets distributed around the circumference of the core ring structure. The arrangement of FIG. 20 offers an improvement of the performance of the FCL by enabling a greater distribution of the DC magnetic field sources in the structure which allows a greater volume of the soft magnetic core to be saturated.

The number of turns of the AC windings in the arrangements shown in FIGS. 11, 19 and 20 can be altered so as to ensure that the H values are equal in the inner and outer cores of the structure which have differing path lengths. Therefore the number of turns N is tailored to give a certain AC field value (H) for a given magnetic current I and path length l, in order to ensure the same flux density B is generated in the magnetisable material in the core sections e.g. inner and outer cores which form the core as a whole.

Consideration can be given to the pitch of the winding i.e. the concentration of the winding at different regions of the core for a given number of turns of the coil, (whereby windings are placed closer together in regions that require a stronger magnetic field and windings are spaced apart at larger intervals where a reduced magnetic field strength is desired). The pitch is varied so as to uniformly take out 50% of the core during each half cycle. This variation of the pitch of the winding would also avoid regions of the core which are initially under-saturated thereby minimising the coil inductance under non-fault conditions.

In an alternative embodiment the permanent magnets could be replaced by DC conducting or superconducting coils containing a soft magnetic or an air core. This would provide adjustability of the DC static magnetic flux. The interaction of the AC and DC fluxes are the same as described when selecting permanent magnet configuration. It is also envisaged that a combination of a DC coil and a permanent magnet can be implemented too.

In an alternative embodiment of FIG. 18, additional permanent magnets could be inserted at positions around the cross sectional circumference of the toroidal core, or alternatively the permanent magnet may be replaced with a poloidal winding along which is provided a DC current so as to generate a static DC magnetic field.

The embodiments of the invention may exist as multilayers of air gapped magnets and cores so as to form discrete sectors i.e. the core is formed from at least two segments which are arranged to form the core as a whole. The sectored, or air gapped core, has constructional benefits enabling a high current winding to be manufactured in sections or segments, whereby piece parts of the core sectors and corresponding coil sectors can be assembled to form the completed toroid structure.

The present invention comprises combinations of features described with respect to different embodiments.

Advantages include that the FCL is always ready as a) it responds equally to each half of the AC cycle and b) the permanent magnets are not easily permanently demagnetised, springing back to their original magnetic condition after a fault current event has occurred. The FCL greatly reduces the use of costly materials compared to the prior art and is also operable over a broad power range in single and three phase alternating power systems such that the FCL can be used in low power, (i.e. more numerous) applications and high power applications. Further, the relative orthogonal arrangement between the DC/static magnetomotive force source and the varying magnetomotive force source protects the permanent magnets and aids saturation of the core material since the DC/static magnetomotive force can be more distributed without increasing the AC reluctance of the core material (since the relative permeability of the permanent magnet material is low and is seen by the AC magnetomotive force as a high reluctance element in the magnetic circuit).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements except when specifically stated as such and vice-versa. The mere fact that certain features are recited in mutually different dependent claims does not indicate that a combination of these features cannot be used to advantage.

The invention claimed is:

1. A fault current limiter (FCL) comprising:
   a plurality of magnetisable core member pairs arranged in a stacked formation;
   at least one AC coil configured to generate a varying magnetic flux in at least a portion of the plurality of magnetisable core member pairs of the stacked formation; and
   a plurality of static magnetomotive force sources configured to provide a magnetic circuit within at least part of the plurality of magnetisable core member pairs of the stack formation, wherein at least part of the plurality of static magnetomotive force sources are positioned between corresponding magnetisable core member pairs of the stacked formation,
   wherein the at least one AC coil produces an AC flux that is orthogonal to magnetic moments produced by the plurality of static magnetomotive force sources,
   wherein the magnetisable core members contain at least one air gap,
   wherein at least one air gap is arranged between two adjacent permanent magnets of the a plurality of static magnetomotive force sources so as to space apart the two adjacent magnets,
   wherein the at least one air gap in the magnetisable core members is positioned above and below respective surfaces of pole faces of the adjacent permanent magnets, and
   wherein at least one of the adjacent permanent magnets is intersected by an air gap.

2. A fault current limiter according to claim 1, wherein the plurality of magnetisable core member pairs each include a first core member spaced from a second core member.

3. A fault current limiter according to claim 2, wherein the first core member comprises a first closed magnetic circuit and the second core member comprises a second closed magnetic circuit distinct from the first closed magnetic circuit.

4. A fault current limiter according to claim 3, wherein the first and/or second magnetic circuit are comprised of core members spaced by air gaps.

5. A fault current limiter according to claim 3, wherein the static magnetomotive force sources are positioned to provide magnetic saturation in the first and the second magnetic circuits of each magnetisable core member pair of the stacked formation.

6. A fault current limiter according to claim 2, wherein the part of the plurality of static magnetomotive force sources positioned between corresponding magnetisable core member pairs of the stacked formation are configured to bridge the space between the first and second core members of the corresponding magnetisable core member pairs of the stacked formation.

7. A fault current limiter according to claim 1, wherein the static magnetomotive force sources are positioned to provide a bifurcated magnetic field in the core adjacent to the static magnetomotive force sources in which the field direction in the same core member branches in opposed directions at the junction with the static magnetomotive force sources.

8. A fault current limiter according to claim 1, wherein the AC coil has a longitudinal axis and to which is applied an AC current so as to produce an AC magnetic field.

9. A fault current limiter according to claim 1, wherein the static magnetomotive force sources include a plurality of magnets each having a magnetic dipole moment associated with it.

10. A fault current limiter according to claim 1, wherein the AC coil has a longitudinal axis and to which is applied an AC current so as to produce an AC magnetic field, wherein the static magnetomotive force sources include a plurality of magnets each magnet having a magnetic dipole moment associated with it, and whereby the AC coil and the magnets are relatively positioned such that the longitudinal axis of the coil is orthogonal to the magnetic dipole moment of each of the magnets.

11. A fault current limiter according to claim 9, wherein the magnets are formed from a permanent magnetic material having a default magnetisation.

12. A fault current limiter according to claim 11, wherein the arrangement of the magnets causes at least part of the plurality of core members to become magnetically saturated in normal operation.

13. A fault current limiter according to claim 1, wherein in a fault condition a magnitude of an AC magnetic field increases from a normal state value to overcome magnetic saturation in at least part of the plurality of core members.

14. A fault current limiter according to claim 7, wherein the AC coil obtains a higher inductance value when a fault condition occurs.

15. A fault current limiter according to claim 2, wherein the magnetisable core members respond equally to positive and negative halves of an AC current cycle received by the AC coil.

16. A fault current limiter according to claim 1, wherein the static magnetomotive force sources include a permanent magnet that recovers its default magnetised state on cessation of a fault current event.

17. A fault current limiter according to claim 1, wherein the AC coil is wound around a region of the plurality of magnetisable core members where an overcoming of saturation is to be achieved.

18. A fault current limiter according to claim 17, wherein the AC coil is wound around the outer circumference of the plurality of magnetisable core member pairs of the stacked configuration.

19. A fault current limiter according to claim 1, further comprising shielding to minimize the effects of eddy currents or demagnetization of the static magnetomotive force sources.

20. A fault current limiter according to claim 1, wherein at least one of the magnetisable core members are formed of strip steel or other ferromagnetic metal alloy, a soft ferrite material or an amorphous, or nanocrystalline soft magnetic alloy.

21. A fault current limiter according to claim 1, wherein at least one magnetisable core member of the plurality of magnetisable core member pairs of the stacked formation is formed from at least two core segments which are arranged to form the magnetisable core member.

22. A circuit including the fault current limiter of claim 1.

23. An alternating current power system including the fault current limiter of claim 1.

24. A fault current limiter according to claim 1, wherein at least one magnetisable core member of the plurality of magnetisable core member pairs of the stacked formation has a void defined therein.

25. A method of preventing a fault condition in an AC magnetomotive force source comprising:
provoking a fault current limiter according to claim 1;
using the plurality of static magnetomotive force sources to create a magnetic circuit within at least part of a plurality of magnetisable core member pairs of the stacked formation so as to saturate at least part of the plurality of magnetisable core member pairs of the stacked formation, thereby providing a low inductance for the AC magnetomotive force source enabling current to flow along the AC magnetomotive force source in normal operation;
producing an AC magnetic field which overcomes the saturation in the part of the plurality of magnetisable core member pairs of the stacked formation in the event of a fault condition; and
increasing the inductance of the AC magnetomotive force source in the event of the fault condition so as to limit the passage of fault current flowing therethrough.

26. A method according to claim 25 wherein the fault current limitation responds equally to either half of the AC cycle.

* * * * *